(12) United States Patent
Biwersi

(10) Patent No.: US 11,199,272 B2
(45) Date of Patent: Dec. 14, 2021

(54) CONTROL DEVICE

(71) Applicant: HYDAC Systems & Services GmbH, Sulzbach (DE)

(72) Inventor: Sascha Alexander Biwersi, Mettlach (DE)

(73) Assignee: HYDAC SYSTEMS & SERVICES GMBH, Sulzbach (DE)

( * ) Notice: Subject to any disclaimer, the term of this patent is extended or adjusted under 35 U.S.C. 154(b) by 0 days.

(21) Appl. No.: 17/056,095

(22) PCT Filed: May 9, 2019

(86) PCT No.: PCT/EP2019/061895
§ 371 (c)(1),
(2) Date: Nov. 17, 2020

(87) PCT Pub. No.: WO2019/219489
PCT Pub. Date: Nov. 21, 2019

(65) Prior Publication Data
US 2021/0207627 A1    Jul. 8, 2021

(30) Foreign Application Priority Data

May 18, 2018  (DE) ..................... 10 2018 207 927.7
May 18, 2018  (DE) ..................... 10 2018 207 928.5
May 18, 2018  (DE) ..................... 10 2018 207 929.3

(51) Int. Cl.
*F16K 11/07*   (2006.01)
*F15B 13/04*   (2006.01)
(Continued)

(52) U.S. Cl.
CPC ...... *F16K 11/0708* (2013.01); *F15B 13/0402* (2013.01); *F15B 13/0444* (2013.01);
(Continued)

(58) Field of Classification Search
CPC .............. F15B 13/0407; F15B 13/0402; F15B 2211/253; F15B 2211/3053;
(Continued)

(56) References Cited

U.S. PATENT DOCUMENTS 3,370,613 A * 2/1968 Weaver ................... B23Q 35/36
                                                                 137/625.69
6,021,813 A * 2/2000 Imhof .................. F15B 13/0402
                                                                 137/625.65
(Continued)

FOREIGN PATENT DOCUMENTS

DE         197 15 020        10/1998
DE      10 2006 002 920        7/2007
(Continued)

OTHER PUBLICATIONS

International Search Report (ISR) dated Jul. 25, 2019 in International (PCT) Application No. PCT/EP2019/061895.

*Primary Examiner* — Thomas E Lazo
(74) *Attorney, Agent, or Firm* — Wenderoth, Lind & Ponack, L.L.P.

(57) ABSTRACT

A control device, for a hydraulic consumer (22) and susceptible to vibrations, includes a valve (24) having a control spool (40) controllable by an actuating device (46). The valve (24) has a pressure supply port (P), to which a pressure compensator valve can be connected, which can be supplied with pressure fluid from a pressure supply device. The actuating device (46) has a motor (74). A load-pressure-dependent force on the control spool (40) can be generated by a control device (66). That force at the control spool (40) acts on an electronic motor controller (208) of the DC motor (74), which detects a change of the force and acts as a damping of the vibrations of the consumer (22) against this change of force.

13 Claims, 4 Drawing Sheets

(51) Int. Cl.
*F15B 13/044* (2006.01)
*F15B 15/06* (2006.01)
*F15B 21/00* (2006.01)
*F16K 31/52* (2006.01)

(52) U.S. Cl.
CPC ............ *F15B 15/06* (2013.01); *F15B 21/008* (2013.01); *F16K 31/523* (2013.01)

(58) Field of Classification Search
CPC ...... F15B 2211/7058; F15B 2211/8616; F16K 11/0716; F16K 31/04
See application file for complete search history.

(56) References Cited

U.S. PATENT DOCUMENTS

| | | | | |
|---|---|---|---|---|
| 9,791,065 | B2 * | 10/2017 | Biwersi | ............... F16K 31/1221 |
| 2019/0219177 | A1 | 7/2019 | Biwersi | |

FOREIGN PATENT DOCUMENTS

| | | | | | |
|---|---|---|---|---|---|
| DE | 10 2007 031 429 | | 1/2009 | | |
| DE | 102007031429 | A1 * | 1/2009 | .......... | F15B 13/0444 |
| DE | 10 2013 021 317 | | 6/2015 | | |
| DE | 10 2015 015 685 | | 6/2017 | | |
| DE | 10 2016 011 860 | | 4/2018 | | |
| EP | 2916052 | A1 * | 9/2015 | .......... | F15B 13/0839 |
| JP | 4-88202 | | 3/1992 | | |
| WO | 2017/092855 | | 6/2017 | | |
| WO | WO-2017092855 | A1 * | 6/2017 | ............. | F16K 11/07 |
| WO | 2018/059727 | | 4/2018 | | |
| WO | WO-2018059727 | A1 * | 4/2018 | ............. | F16K 11/07 |

* cited by examiner

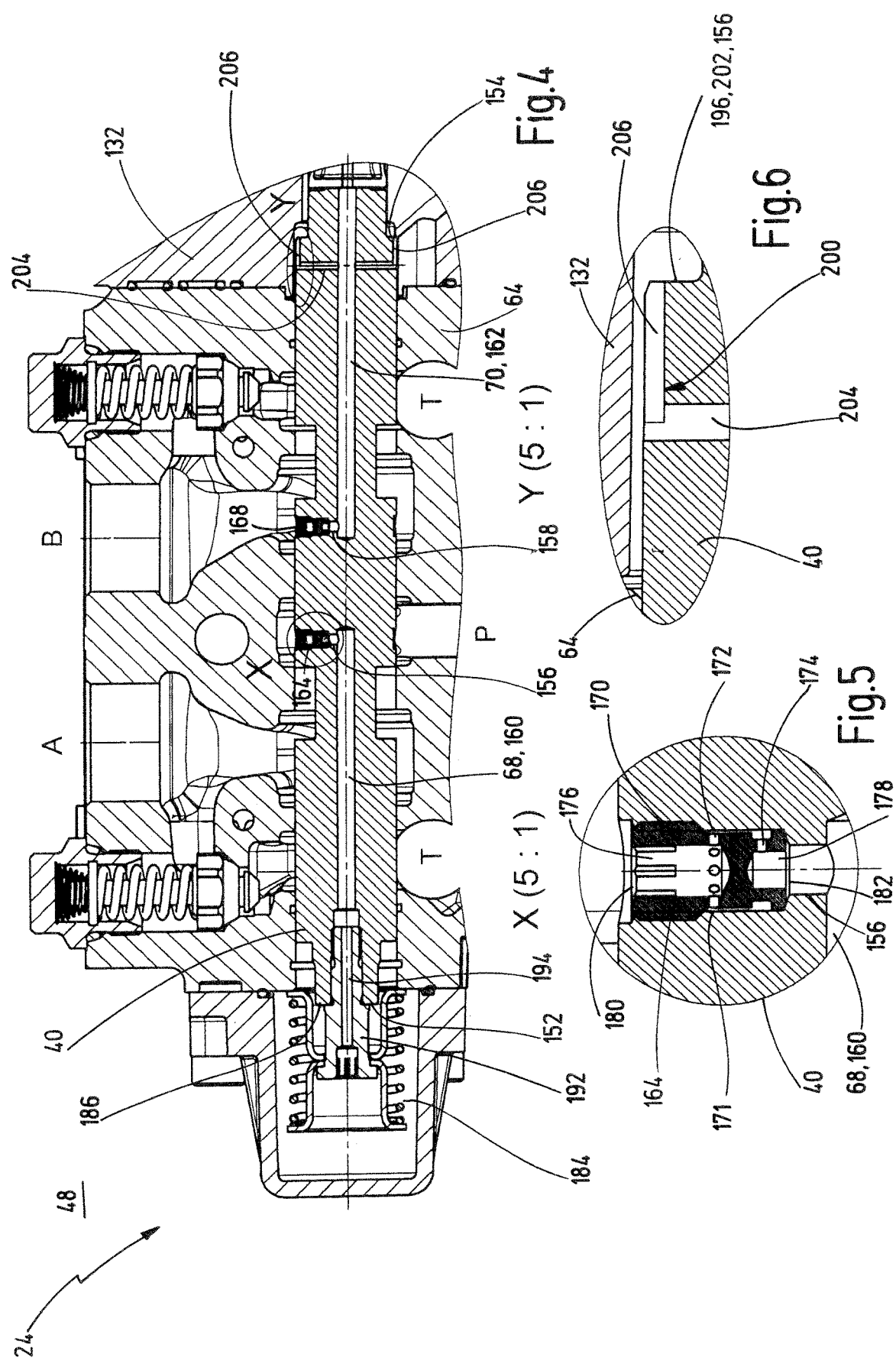

CONTROL DEVICE

FIELD OF THE INVENTION

The invention relates to a control device for a hydraulic consumer, susceptible to vibrations. The control device includes a valve having a control spool, which can be controlled by an actuating device. The valve has a pressure supply port, to which a pressure compensator valve can be connected. The pressure compensator can be supplied with pressure fluid from a pressure supply device. The actuating device has a motor. A load-pressure-dependent force on the control spool can be generated by a control device.

BACKGROUND OF THE INVENTION

In practice, such control devices are often used to control slewing gears, for instance of cranes or excavators. Frequently, these slewing gears have a hydraulic motor that can be driven in two opposite directions of rotation to turn the structure of the crane or excavator in a desired direction or position.

The known control devices have a detrimental behavior. If the spool of these control devices is opened or closed abruptly, a control behavior is generated in connection with the pressure compensator valve that matches a PT-2 element in terms of control. Vibrations are then generated in the volume flow of the hydraulic fluid, which vibrations are then dampened by the control device. These vibrations are transmitted to the consumer, forming torsional vibrations, which can result in the consumer being difficult to control. Under certain circumstances, the consumer may also be damaged.

SUMMARY OF THE INVENTION

The invention therefore addresses the problem of providing an improved control device, which exhibits a strongly or maximally reduced PT-2 behavior.

This problem is basically solved by a control device having the load-pressure-dependent force at the control spool act on an electric motor controller of the motor, which detects a change of the force and acts as a damping of the vibrations of the consumer against this change of force.

In the solution according to the invention, the load pressure exerts a force on the control spool. That force is transmitted to the motor, which evaluates this force and then moves the control spool taking this force into account. The load pressure is acquired directly such that occurring vibrations by the motor and the actuation of the control spool are effectively dampened or even compensated. Based on the control device according to the invention, several pressure sensors, which measure the load pressure in the supply line and return line, can be omitted. In addition, the solution is particularly low-wear, therefore has a particularly long service life and is cost-effective because no additional components have to be installed and maintained.

In an advantageous embodiment, a rotation angle sensor is assigned to the motor controller. The rotation angle sensor comprises preferably a Hall sensor connected to the housing and a rotatable magnet attached to a motor shaft of the motor. A rotation of the motor shaft that is proportional to the displacement of the control spool can then be evaluated and transmitted to a motor controller, which then controls the motor accordingly.

In an advantageous embodiment, the control device has a motor in the form of a brushless DC motor (ec motor) having a sensorless commutation. This sensorless commutation permits the detection of a rotor position, corresponding to the load-pressure-dependent force acting on the control spool, of the DC motor by a counter-voltage applied to the coils of a stator. That voltage can be evaluated by the motor controller. Because of the sensorless commutation, the pressure forces at the control spool are effectively transmitted to the DC motor where they can be easily evaluated to determine the rotor position.

The coils of the DC motor can, below a predeterminable minimum speed, especially at standstill, receive by the motor controller current pulses, which keep the motor at standstill, but nevertheless influence the magnetic field of the rotor. By the magnetic field of the rotor, the current flow through the coils can be changed as a result of the change in the load-pressure-dependent force in such a way that the rotor position, which can ultimately be used to correct the position of the control spool, can be determined. A particular advantage here is that the solution shown permits the reliable detection of the rotor position, even at particularly low rotor speeds.

Preferably, the DC motor moves the control spool, which is guided in a valve housing of the valve in a longitudinally displaceable manner, via a gear transmission. Because of the gear transmission, there is a direct proportional relationship between the axial position of the control spool and the angle of rotation of the rotor. This relationship is used both to measure the load-pressure-dependent force and to position the control spool.

The hydraulic load can be a hydraulic motor having two opposite directions of rotation.

The pressure supply device is advantageously a LS-pressure controlled swivel angle pump, which can be controlled by the valve. In this way, the power of the pressure supply device can be adapted to the specific needs of the consumer.

The valve housing may have a pressure supply port, at least two utility ports that are alternately exposed to a load pressure or a return pressure, and a return port.

Particularly advantageously, the control spool, in its neutral position or center position in the valve housing as part of the control device, shuts off two signal lines. In travel positions of the control spool outside of the neutral position or center position, the signal lines transmit the load pressure to a first control side and the return pressure to an opposite second control side of the control spool. In this way, the pressures applied to the utility ports in the neutral position cannot displace the spool, while every time the spool is displaced from the neutral position, the load pressure is reliably transmitted to the control sides of the spool and then to the motor controller of the DC motor. Because the pressure at the pressure supply port is always only slightly higher than the load pressure at the pressurized utility port, one of the control ends of the control spool can also be pressurized with the pressure at the pressure supply port representing the load pressure in a simplified manner.

In the two signal lines, one orifice each can be installed. The orifice ensures that on the one hand the pressure is reliably signaled to the control sides, and on the other hand excessive leakage is prevented. As a further function, the orifice contributes to damping the motions of the control spool.

The two control sides of the spool are advantageously guided in control chambers of the valve housing. Each of the control chambers is connected to a tank or any other return line via a return orifice. By connecting the control chambers to the tank, pressure relief can be achieved. The pressure relief facilitates the motion of the spool in the valve housing.

Other objects, advantages and salient features of the present invention will become apparent from the following detailed description, which, taken in conjunction with the drawings, discloses a preferred embodiments of the present invention.

BRIEF DESCRIPTION OF THE DRAWINGS

Referring to the drawings that form a part of this disclosure:

FIG. 4 is a partial side view in section of the valve of FIG. 3, wherein the control spool is shown in sectional view;

FIG. 5 is an enlarged side view in section of Detail X of FIG. 4; and

FIG. 6 is an enlarged side view in section of Detail Y of FIG. 4.

DETAILED DESCRIPTION OF THE INVENTION

Figure 1:
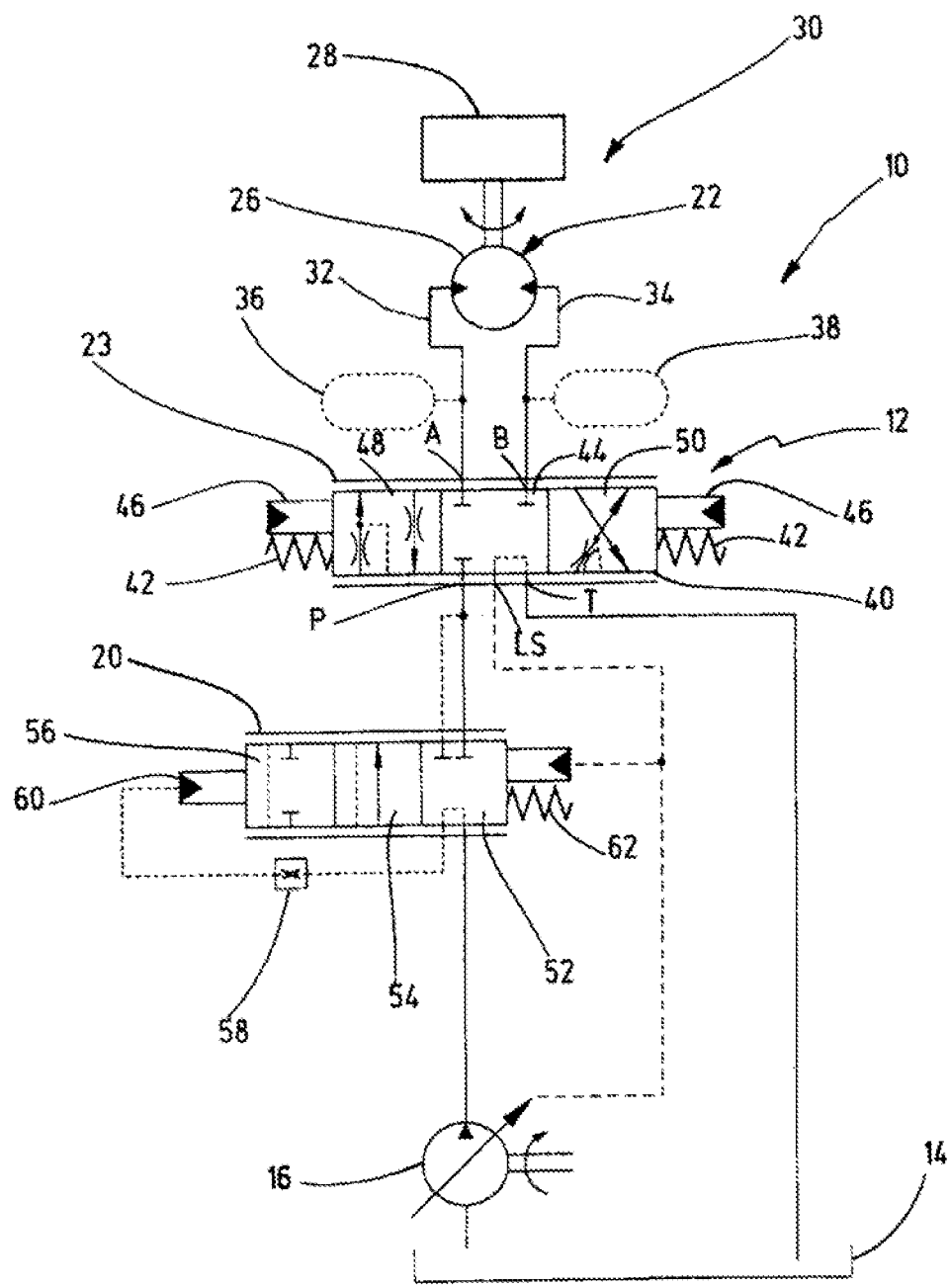
FIG. 1 is a schematic circuit diagram of a state-of-the-art hydraulic system having a valve.

FIG. 1 shows schematically a state-of-the-art hydraulic system 10 having a control device 12. A pressure supply device 16 in the form of a pump sucks pressure fluid, in particular a hydraulic fluid, from a tank 14 and delivers it to a pressure compensator valve 20. Depending on the load pressure of a consumer 22, the pressure compensator valve 20 controls the pressure supply of a downstream valve 23 of the control device 12. The valve 23 drives the consumer 22, comprising of a hydraulic motor 26 and a mass 28. The hydraulic motor 26 is part of a slewing gear 30, which can be driven in two opposite directions of rotation in order to move the mass 28 into desired rotational positions or to drive it at a desired rotational speed. Capacitors 36, 38, especially in the form of hydraulic accumulators, can be connected to connecting lines 32, 34 between the valve 23 and the hydraulic motor 26.

The valve 23 is a 4/3 directional valve. The valve's control spool 40 is centered by a spring arrangement 42 in a neutral or center position 44, and is moveable from one of its control positions 44, 48, 50 to the other(s) by an actuating device or actuator 46. In addition to a pressure supply port P, the utility ports A, B and the tank port T, the valve 23 also has a tap for the load pressure LS to transmit it to the pressure compensator valve 20 and to the pressure supply device 16.

The pressure compensator valve 20 is provided upstream of the valve 23. The compensator valve 20 has three control positions 52, 54, 56. In a control position 52, on the right in the image plane of FIG. 1, the connection from the pressure supply device 16 to the valve 23 is interrupted. The pump pressure is signaled to a control end 60 of the pressure compensator valve 23 via a pressure compensator valve orifice 58 and counteracts a return spring 62 and, if necessary, a load pressure signaled by the valve 23. In the center position 54 of the pressure compensator valve 20, the valve 23 is connected to the pressure supply device 16, and a pressure present at the pressure supply port P of the valve 23 is signaled to the left control end 60 of the pressure compensator valve 20 via the pressure compensator valve orifice 58. In a left control position 56, the fluid connection between the pressure supply device 16 and the valve 23 is again interrupted, and the pressure present at the pressure supply port P of the valve 23 is transmitted to the left control end 60 of the pressure compensator valve 20.

Now the valve 24 according to an exemplary embodiment the invention, which replaces the state-of-the-art valve 23, is explained with reference to FIG. 2. The valve 24 is a LS directional control valve in the form of a spool valve. In the embodiment shown in FIGS. 2-6, the construction of the valve housing 64 including the associated control spool 40 corresponds as far as possible to the valve device known from DE 10 2013 021 317 A1, to which reference is made. The difference of the invention is that the control spool 40 is provided with a control device or control 66 having special signal lines 68, 70 and an electromotive actuator 72 in the form of an brushless motor 74. The construction of valve 24 permits a particularly advantageous use of the device 12 according to the invention in series applications of valve blocks having closely adjacent valve devices. The terms 'top' and 'bottom' as used in this application refer to a normal mounting position as shown in FIGS. 2-6.

In accordance with the solution disclosed in DE 10 2013 021 317 A1, the control spool 40 can be moved in a valve housing 64 along an axis 76. The valve housing 64 has pairs of opposing longitudinal or axial end sides (not shown) and front sides 82, 84. Furthermore, the valve housing 64 has a top end 86 and a bottom end 88. According to FIG. 2, the housing walls 90 are shown cut-off. The sides 82-88, extending in planes parallel to each other, can protrude in all directions. The valve housing 64 also has, as is usual for this type of valve device, housing ports, such as a pressure supply port P, two utility ports A, B, a return port and a load-pressure port. The ports P, A, B, which are regularly provided in the form of drilled holes in the valve housing 92, 94, 96, have longitudinal axes 98, 100, 102 represented by dashed lines.

Figure 2:
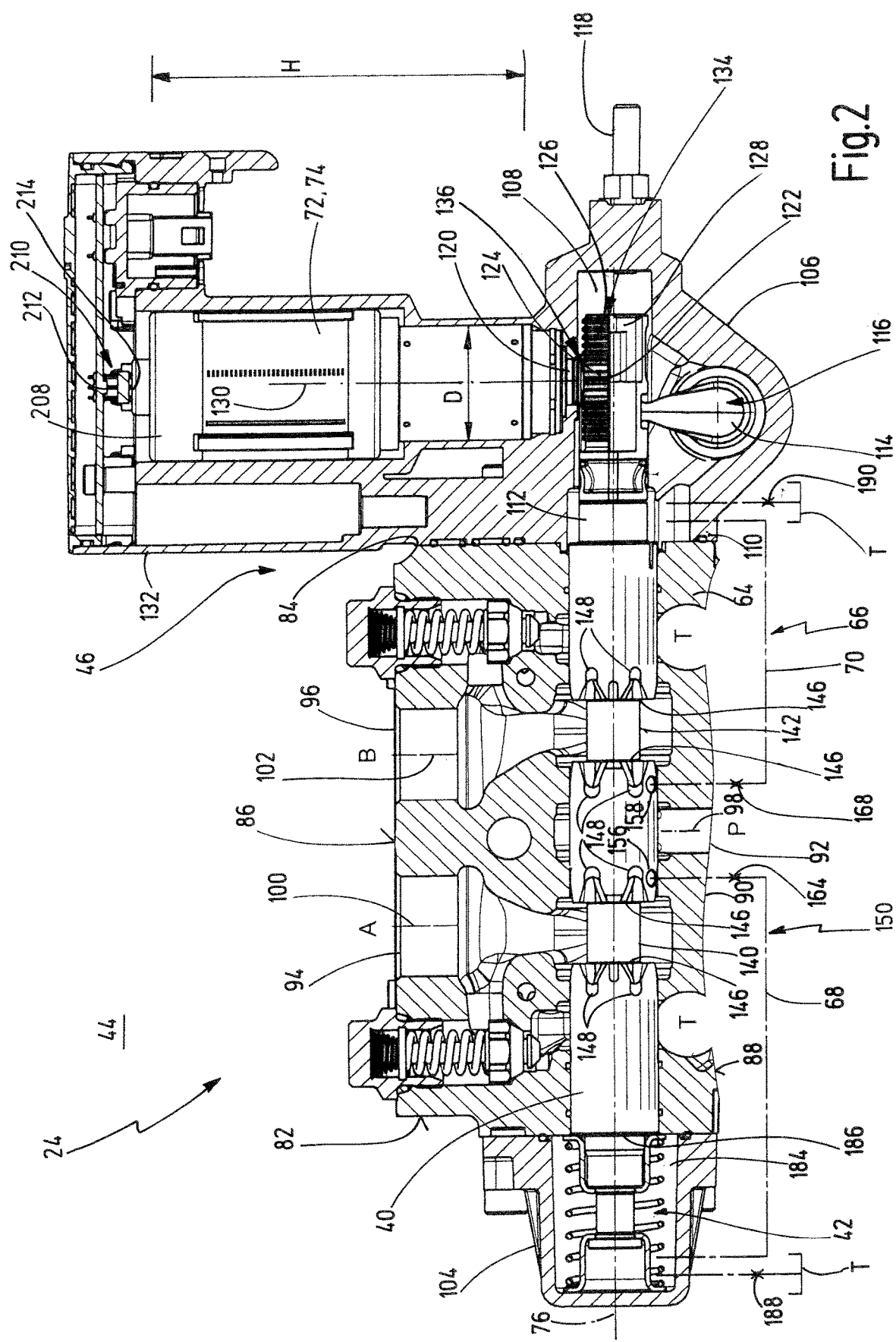
FIG. 2 is a side view in section through a valve according to an exemplary embodiment of the invention, shown in a neutral position.

The spring arrangement 42 located in the left end of the housing 104 provides a neutral or center position 44, shown in FIG. 2, for the control spool 40 in a way that is usual for valves of this type. At the right end in FIG. 2, opposite from the left housing area 104, a housing end part 106 adjoins to the valve housing 64, Housing end part 106 contains an inner chamber 108 extending coaxially to the axis 76. Chamber 108 is sealed against the valve housing 64 by a seal 110, but is to be regarded as a component of the valve housing 64. Corresponding to the valve device known from DE 10 2013 021 317 A1, an end section 112 of the control spool 40 extends into the chamber 108 and interacts with an actuating part 114 of an emergency actuation 116 and a stroke length limiter 118 of the control spool 40 inside the chamber 108. Because the limiter 118 also corresponds to the solution based on adjustment bolts known from the document, no further description is required.

The brushless motor 74, serving as an actuator 72, is arranged at the housing end part 106 such that its motor shaft 120 vertically intersects the axis of travel 76 of the spool piston 40. A pinion 124, located at the end 122 of the motor shaft 120, is located inside the chamber 108. A rack 126 is attached to the end section 112 of the control spool 40. The rack 126 meshes with the pinion 124. Alternatively, a multi-stage, in particular two-stage, planetary gear or an eccentric spur gear can be provided. The minimal or non-existent self-locking action of the drive also permits the advantageously simple construction of the emergency manual override 116. As with the above-mentioned known solution, the control spool 40 is non-rotatably guided in the chamber 108, such that the rack 126 is always in contact with a guiding sliding element 128 during axial motions caused by the pinion 124. Instead of the sliding element 128 shown, a roller bearing or a roller could also be provided.

In the embodiment shown, the electric motor is in the form of a brushless motor 74. At a dimensional ratio of the diameter D to the height H of considerably less than 1.5, preferably less than 1. Such motor 74 provides torque permitting a fast and safe valve actuation. Its slim design permits a close side-by-side arrangement of the valve 24 in valve blocks.

As FIG. 2 further shows, a drive axis 130 or a motor housing 132, respectively, reaches through the fictitious extension of the top 86 of the valve housing 64. Furthermore, the drive axis 130 of the electric motor 74 is oriented in parallel to the longitudinal axes 98-102 of the fluid ports P, A, B.

The inner chamber 108, which is sealed to the outside, is filled with oil from the valve housing 64, such that the gear arrangement 134 formed by the pinion 122, the rack 126 and the sliding element (not shown in more detail) operate in oil. The seal against the motor housing 132 of the electric motor 74 is formed by a rotary seal 136 provided on the motor shaft 120.

The entire width of valve device 12 is available for the diameter of the round motor housing 132 in the direction of the side-by-side arrangement in a valve block. At a correspondingly small diameter of the DC motor 74 and the motor housing 132, a lateral displacement of the motor shaft 120 towards the axis of travel 76 of the control spool would also be possible, such that the motor shaft 120 is perpendicular to the axis of travel 74. The motor shaft 120 still vertically intersects the plane containing the axis of travel 76.

The control spool 40 is provided with ring recesses 140, 142 in the areas of the utility ports A and B. These ring recesses 140, 142 are delimited by opening edges 146, which have control grooves 148. A pressure divider circuit 150 is also provided. By the pressure divider circuit 150 the pressures at the utility ports A, B, i.e. the pressure of the supply line V and the pressure of the return line R, are led to opposite control sides 152, 154 of the control spool 40, when the control spool 40 is outside of the neutral position 44, see FIGS. 3 and 4. For this purpose, the two signal lines 68, 70 are provided in the control spool 40 separately from each other. Each signal line 68, 70 connects a utility port A, B to an adjacent control side 152, 154. For this purpose, a radial drilled hole 156, 158 is provided for each signal line 68, 70 between the ring recesses 140, 142 of the utility ports A, B. Each drilled hole 156, 158 is positioned such that it is covered by the valve housing 64 when the control spool 40 is arranged in a neutral or center position 44 (see FIG. 2). If the control spool 40 is arranged outside of this neutral position 44, one of the radial drilled holes 156 is connected to the utility port A, pressurized with the load pressure, via the pressure supply port P and the other drilled hole 158 is connected to the utility port B, pressurized with the return pressure (cf. FIGS. 3 and 4). Each radial drilled hole 156, 158 opens into a control chamber on a control end 152, 154 of the control spool 40 via an axial drilled hole 160, 162 in the control spool 40 (FIG. 4).

As can be seen from FIGS. 2, 4 and 5, two orifices 164, 168 in the signal lines 68, 70 are provided in the control spool 40. The orifices 164, 168 are identical and each formed by a screw-in part 170, which is screwed into one of the radial drilled holes 156, 158 from the outside. In this way, a fluid connection can be established between the assigned utility ports A, B and the control sides 152, 154 of the control spool 40 via the respective orifices 164, 168. In conjunction with the wall 171 of the control spool 40, the respective screw-in part 170 forms a fluid path between at least two transverse drilled throttling holes 172, 174 arranged one above the other in the screw-in part 170. The respective transverse drilled hole 172, 174 in the screw-in part 170 are each connected to a respective longitudinal drilled hole 176, 178 in the screw-in part 170. The ends 180, 182 of the longitudinal drilled holes 176, 178, facing away from each other, open out into the control channels 68, 160; 70, 162 in the control spool 40 on the one hand and, depending on the respective travel position of this control spool, into the pressure supply port P or into one of the utility ports A, B on the other hand.

The control chambers 184, 108 at the ends 186, 112 of the control spool 40 are each connected to a tank via return orifices 188, 190.

Figure 3:
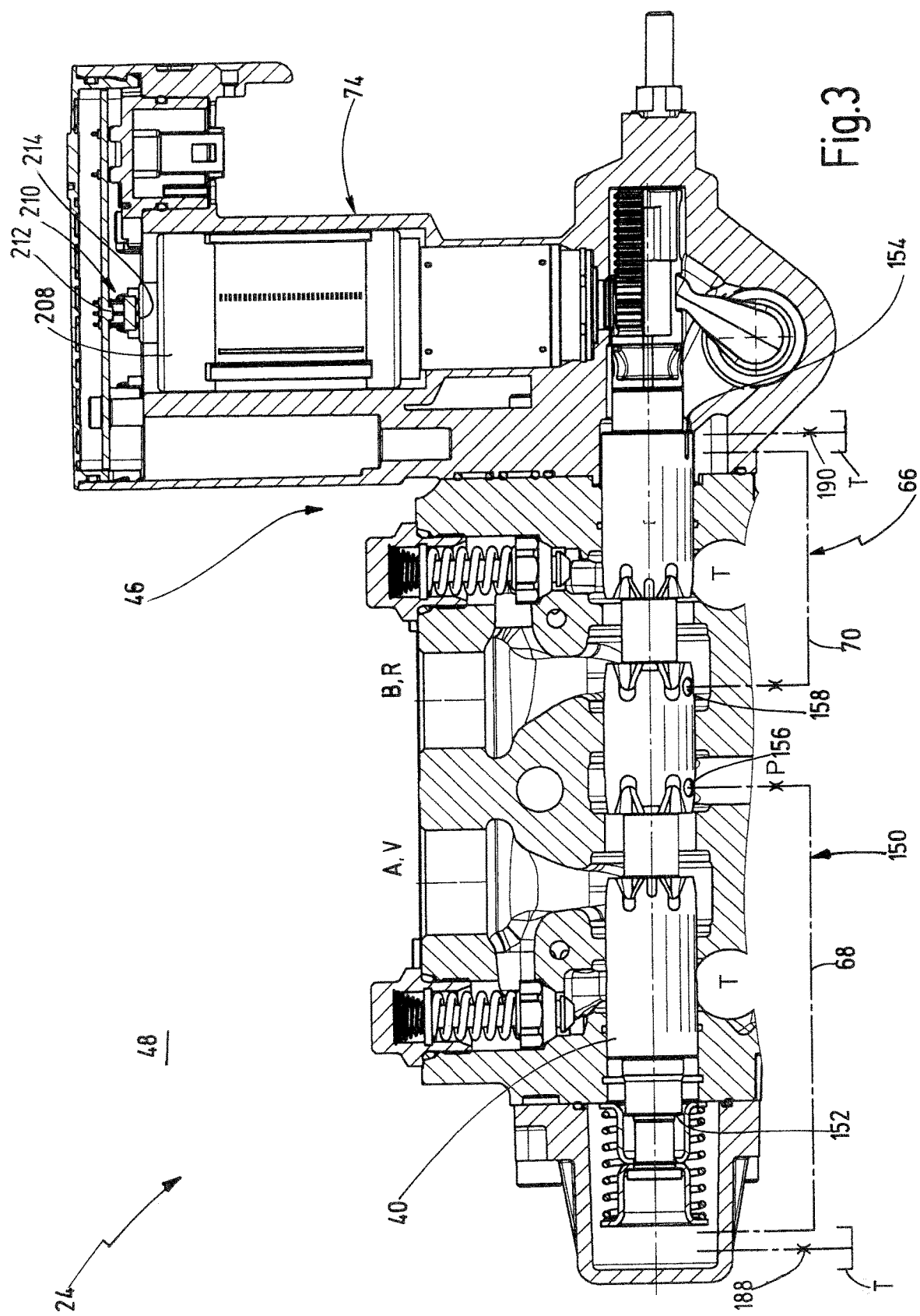
FIG. 3 is a side view in section through the valve of FIG. 2, wherein the control spool is moved to an end position.

FIGS. 3 and 4 show the valve 24 according to the invention wherein the control spool 40 is moved to its right end position 48. In this position the pressure supply port P is connected to the utility port A. Accordingly, the pressure at the pressure supply port P is transmitted to the left-hand control side 152 of the control spool 40 via the signal line 68 provided in the control spool 40. As FIG. 4 in particular shows, a screw 192 of the spring arrangement 42 is screwed into the axial drilled hole 160 of the signal line 68. The screw 192 also has an axial drilled hole 194 to connect the axial drilled hole 160 in the control spool 40 to the assigned control side 152.

At its right end 122, the control spool 40 has a shoulder 196. To ensure that the control sides 152, 154 at both ends 186, 112 of the control spool 40 have the same surface area to ensure that the control behavior of the control device 12 is identical in both actuation directions, a fluid connection 200 is established from the signal line 70 to the annular part 202 of the control side 156, as is shown in FIGS. 4 and 6. The fluid connection 200 comprises a cross drilled hole 204 of the control spool 40 and at least one, shown are two, axial groove(s) 206 of the control spool 40.

The mode of operation of the control device 12 according to the invention is explained below.

When the control spool 40 is located in the neutral or center position 44, the valve housing 64 separates the signal lines 68, 70 from the utility ports A, B, see FIG. 2. Therefore, in this position 44, the pressures in the supply line V and in the return line R are not led to the control sides 152, 154 of the control spool 40. Instead, the control sides 152, 154 of the control spool 40 are depressurized towards the tank T via the return orifices 188, 190. In this position, the DC motor 74 receives no load pressure signal, and therefore, controls the control spool 40 independently of the load pressure.

When the control spool 40 is arranged outside of the neutral position 44, connections are established from the utility ports A, B to the control sides 152, 154 via the signal lines 68, 70, see FIGS. 3 and 4. In these cases, the pressure at the utility ports A, B acts on the control sides 152, 154. The pressure in the supply line V acts on the control spool 40 in such a way that it attempts to move the control spool 40 in a direction that opens the connection from the pressure supply port P to the assigned utility ports A or B to the maximum opening possible. In the case of FIGS. 3 and 4, the DC motor 74 moves the control spool 40 to the right. The fluid pressure of the supply line V therefore pressurizes the left control side 152 of the control spool 40, and therefore, exerts a force on the control spool 40 also towards the right.

In one embodiment, the deflection of the control spool 40 is transmitted to the motor shaft 120 via the rack 126 and the pinion 124. A rotation angle sensor 210, assigned to a motor controller 208, detects the rotation of the motor shaft 120. The rotation angle sensor 210 comprises a Hall sensor, connected to the housing 212, and a rotatable magnet 214, attached to a motor shaft 120 of the motor 74. In this solution, the load pressure causes a rotary motion of the motor shaft 120, which is evaluated by the rotation angle sensor 210 and transmitted to the motor controller 208, which then controls the motor 74 accordingly to move the control spool 40 as a function of the load pressure.

In a further embodiment, the compressive force, exerted on the control spool 40, is transmitted to the rotor of the DC motor 74 via the rack 126 and pinion 124 and generates electrical counter voltages in the coils of the stator, such that the current flow through the coils is altered. That current flow is evaluated by a motor controller 208 of the DC motor 74 and used to control the position of the control spool 40. In this solution, the load pressure exerts a force on the control spool 40. That force is transmitted to the DC motor 74, which evaluates this force and then moves the control spool 40 taking this force into account.

The load pressure is in each case acquired directly such that by the DC motor 74. The control of the control spool 40 occurring vibrations are effectively dampened or even compensated. Based on the control device 12 according to the invention, several pressure sensors, which measure the load pressure in the supply line V and the return line R, can be omitted. In addition, the solution is particularly low-wear, therefore has a particularly long service life and is cost-effective because no additional components have to be installed and maintained.

While one embodiment has been chosen to illustrate the invention, it will be understood by those skilled in the art that various changes and modifications can be made therein without departing from the scope of the invention as defined in the claims.

The invention claimed is:

1. A control device for a hydraulic consumer susceptible to vibrations, the control device comprising:
   a control valve including a control spool connected to and controlled by an actuator and including a pressure supply port connectable to a pressure compensator valve connected to a pressure supply source;
   a DC motor being the actuator; and
   a control generating a load-pressure-dependent force on the control spool, the load-pressure-dependent force acting on an electric motor controller of the DC motor, the electric motor controller detecting a change of force and damping vibrations of the hydraulic consumer against the change of force.

2. A control device according to claim 1 wherein
   a rotation angle sensor is connected to the electric motor controller.

3. A control device according to claim 2 wherein
   the rotation angle sensor comprises a Hall sensor connected to a motor housing and a rotatable magnet attached to a motor shaft of the DC motor.

4. A control device according to claim 1 wherein
   the DC motor is a brushless DC motor having a sensorless commutation permitting detection of a rotor position of a rotor of the DC motor, corresponding to the load-pressure-dependent force acting on the control spool, by counter-voltage applied to coils of a stator of the DC motor, the counter-voltage being able to be evaluated by the electric motor controller.

5. A control device according to claim 4 wherein
   the coils of the stator of the DC motor receives short current pulses by the electric motor controller below a predetermined minimum speed of the DC motor, the short current pulses keeping the DC motor at a standstill such that the current flow through the coils can be changed determining the rotor position.

6. A control device according to claim 1 wherein
   the DC motor moves the control spool in a valve housing of the control valve along a longitudinal axis of the valve spool via a gear transmission.

7. A control device according to claim 1 wherein
   the hydraulic consumer comprises a hydraulic motor having two opposite directions of rotation connected to the control valve.

8. A control device according to claim 1 wherein
   the pressure supply is connected to the pressure supply port via the pressure compensator valve and comprises an LS pressure-regulated swivel angle pump controlled by the control valve.

9. A control device according to claim 1 wherein
   the control valve comprises a valve housing with having the pressure supply port, first and second utility ports and a return port, the first and second utility ports being alternately subjected to a load pressure or a return pressure.

10. A control device according to claim 9 wherein
    the control spool has a neutral or center position in the valve housing;
    the control comprises first and second signal lines extending in the control spool, the first and second signal lines being closed by the valve housing in the neutral or central position of the control spool and being open in travel position, spaced from the neutral or center position, of the control spool in the valve housing transmitting load pressure to a respective control side of the control spool and transmitting a return pressure to an opposite control side of the control spool.

11. A control device according to claim 10 wherein
    the first and second signal lines have first and second orifices therein, respectively.

12. A control device according to claim 10 wherein
    the first and second control sides of the control spool are movably guided in first and second chambers, respectively, in the valve housing, the first and second control chambers being connected to first and second return orifices in fluid communication connectable to a tank.

13. A control device according to claim 10 wherein
    the first and second signal lines are separated and spaced from one another and are connected in fluid communication to first and second control chambers, respectively, receiving the respective control sides of the control spool.

* * * * *